United States Patent [19]

Sekiguchi et al.

[11] Patent Number: 4,960,268
[45] Date of Patent: Oct. 2, 1990

[54] SPACER HOLDER ARRANGEMENT

[75] Inventors: Hideo Sekiguchi; Yasuo Mitoh; Yozi Misawa, all of Osaka, Japan

[73] Assignee: Nitto Denko Corporation, Osaka, Japan

[21] Appl. No.: 305,049

[22] Filed: Feb. 2, 1989

[30] Foreign Application Priority Data

Feb. 3, 1988 [JP] Japan ............................ 63-14042[U]

[51] Int. Cl.⁵ .............................................. B24B 4/04
[52] U.S. Cl. ....................................................... 269/43
[58] Field of Search ................ 269/37, 43, 21, 329, 269/289 R, 296; 51/216 R, 131.5, 216 LP

[56] References Cited

U.S. PATENT DOCUMENTS

| | | | |
|---|---|---|---|
| 3,116,919 | 1/1964 | Alth | 269/21 |
| 4,512,113 | 4/1985 | Budinger | 51/131.5 |

FOREIGN PATENT DOCUMENTS

| | | |
|---|---|---|
| 0192244 | 8/1986 | European Pat. Off. . |
| 57-164452 | 10/1982 | Japan . |
| 57-172551 | 10/1982 | Japan . |
| 60-263354 | 12/1985 | Japan . |
| 61-258352 | 11/1986 | Japan . |
| 62280051 | 12/1986 | Japan . |
| 62-001147 | 1/1987 | Japan . |

OTHER PUBLICATIONS

"Multichannel Digital Optical Disk Memory System", Optical Engineering, vol. 22, No. 4, Jul./Aug. 1983, pp. 464-472 (Kowalski et al.).

*Primary Examiner*—Robert C. Watson
*Attorney, Agent, or Firm*—Sughrue, Mion, Zinn, Macpeak & Seas

[57] ABSTRACT

A spacer holder arrangement includes a support sheet of a self-supporting nature, at least one side of the support sheet having a low adhesive-bonding ability. A pair of concentric inner and outer spacer elements of an annular shape are disposed on the one side of the support sheet to provide a performed spacer, each of the inner and outer spacer elements having adhesive layers formed respectively on opposite sides thereof. One of the adhesive layers is interposed between each of the inner and outer spacer elements and the support sheet to bond them releasably together. The inner spacer element has a central hole therethrough which is coaxial with an aperture formed through the support sheet so that a guide rod can be passed through the aperture and the central hole.

8 Claims, 1 Drawing Sheet

SPACER HOLDER ARRANGEMENT

BACKGROUND OF THE INVENTION

Field of the Invention

This invention relates generally to a spacer for holding a pair of disc-shaped bases of an optical disc of the air-sandwich type in spaced relation to each other, and more particularly to a spacer holder arrangement removably holding such a spacer.

Generally, an optical disc of the air-sandwich type comprises a pair of disc-shaped bases or substrates and a pair of inner and outer ring-shaped spacer elements interposed between and adhesively bonded to the pair of bases to hold them in spaced relation to each other an annular space is formed defined by the pair of bases and the inner and outer spacer elements.

The bonding between the bases of the optical disc and the spacer elements heretofore has been made using an adhesive, for example, of the ultraviolet curing type or the thermosetting type. In this method, the adhesive is applied to the spacer elements immediately before assembling the optical disc, and therefore the spacer elements are liable to be displaced out of position relative to the disc bases. For this reason, it has been necessary to keep the assembled optical disc standstill under a constant pressure until the coated adhesive is cured or set. In this respect, this conventional method is not suited for mass production.

To overcome the problem of keeping such a standstill condition, it has been proposed to use inner and outer spacer elements each having preformed adhesive layers provided respectively on opposite sides thereof. A protective film is attached to the outer side of each adhesive layer. This method overcomes the difficulty encountered with the first-mentioned conventional technique in which the adhesive is used, but it has been found to be still not suited for mass production because each spacer element has to be positioned carefully relative to the bases of the optical disc when adhesively bonding them together after removal of the protective film.

SUMMARY OF THE INVENTION

It therefore is an object of this invention to provide a spacer holder arrangement carrying a preformed spacer by which an optical disc can be assembled easily without the need for positioning of spacer elements, thereby facilitating mass production of the optical discs.

According to the present invention, there is provided a spacer holder arrangement comprising:

(a) a support sheet having at least one aperture formed therethrough, the support sheet being of a self-supporting nature, and at least one side of the support sheet having a low adhesive-bonding ability; and (b) a pair of concentric inner and outer spacer elements of an annular shape disposed on the one side of the support sheet to provide a preformed spacer, each of the inner and outer spacer elements having adhesive layers formed respectively on opposite sides thereof, one of the adhesive layers being interposed between each of the inner and outer spacer elements and the support sheet to bond them releasably together, and the inner spacer element having a central hole therethrough which is coaxial with the aperture through the support sheet so that a guide rod can be passed through the aperture and the central hole.

The inner and outer annular spacer elements, each having the adhesive layers on the opposite sides thereof, are held concentrically in position on the support sheet to provide the preformed spacer. Further, since the support sheet has the aperture disposed coaxially with the inner spacer element, the spacer can be attached easily in position to each base of the optical disc through the guide rod. Thus, the spacer is supported on the support sheet in a preformed condition and can be attached to the bases of the optical disc without changing the relative position between the inner and outer space elements. Therefore, there is no need to position the inner and outer spacer elements relative to each other when assembling the optical disc. This greatly facilitates the mass production of the optical discs.

DESCRIPTION OF THE PREFERRED EMBODIMENTS OF THE INVENTION

The invention now will be described with reference to the drawings.

Figure 1:
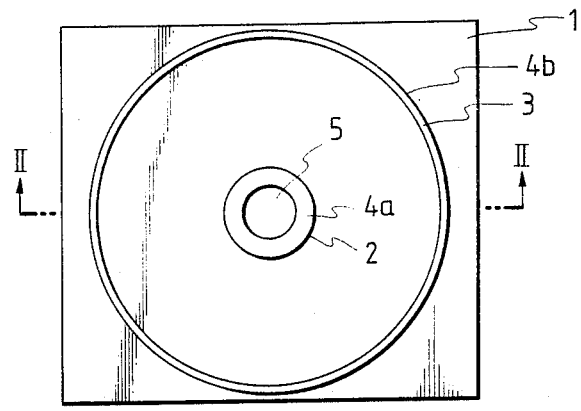
FIG. 1 is a top plan view of a spacer holder arrangement provided in accordance with the present invention.
Figure 2:
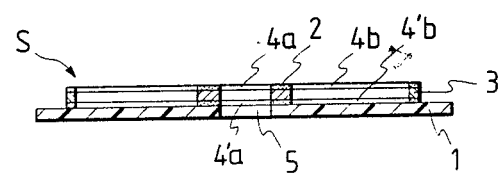
FIG. 2 is a cross-sectional view taken along the line II—II of FIG. 1.
Figure 3:
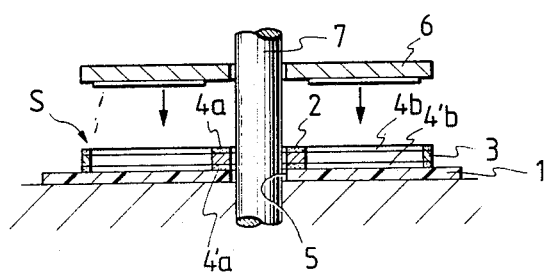
FIG. 3 is a cross-sectional view of the spacer holder arrangement, showing a preformed spacer to be attached to a base of an optical disc.

A spacer holder arrangement shown in FIGS. 1 to 3 comprises a support sheet or film 1 and a preformed spacer S removably mounted on the support sheet 1. The support sheet 1 is flexible and has a self-supporting nature, and at least one side or face of the support sheet 1 has a low adhesive-bonding ability. The preformed spacer S is attached releasably to the one side of the support sheet 1. It is preferred that the support sheet 1 should have a thickness of not less than about 50 $\mu$m to retain the self-supporting properties, although this value varies slightly depending on the material of which the support sheet 1 is made.

For example, the support sheet 1 is made of a polyester film, a polypropylene film, a laminate composed of a substrate such as Kraft paper and a polyolefin film laminated on one side of the substrate, or a resin-treated material composed of a substrate of one of a polyester film, a polypropylene film or the above-mentioned laminate and a coating of a release agent, such as a polyvinyl N-octadecyl carbamate compound and a silicone compound, formed on one side of the substrate.

The preformed spacer S comprises a pair of inner and outer annular or ring-shaped spacer elements 2 and 3 each having a pair of upper and lower adhesive layers $4a$ ($4b$) and $4'a$ ($4'b$) formed respectively on the opposite sides thereof. The inner and outer annular spacer elements 2 and 3 are bonded releasably to the one side of the support sheet 1 through the respective lower adhesive layers $4'a$ and $4'b$ in such a manner that the two spacer elements 2 and 3 are disposed in concentric relation to each other. The adhesive layers $4a$ and $4'a$ ($4b$ and $4'b$) on the opposite sides of each of the inner and outer spacer elements 2 and 3 are annular and equal in width to their mating spacer element and are disposed coaxially therewith. The plane in which the upper adhesive layers 4a and 4b are disposed is parallel to the plane in which the lower adhesive layer 4'a and 4'b lie.

Each of the annular spacer elements 2 and 3 is made of a rigid plastic material such as polycarbonate and methyl methacrylate. The adhesive layers 4a, 4b, 4'a, and 4'b are made of an adhesive which is pressure sensitive either at room temperature (hereinafter referred to as a "cold adhesive type") or upon heating (hereinafter referred to as a "hot adhesive type"). The upper and lower adhesive layers 4a, 4b, 4'a, and 4'b may all be made of the same or similar adhesive. Also, the lower adhesive layers 4'a and 4'b may be of the cold adhesive type while the upper adhesive layers 4a and 4b are of the hot adhesive type. In the latter case, it is not particularly necessary to protect the outer surface of the upper adhesive layers 4a and 4b during storage of the spacer holder arrangement. In the case where the upper adhesive layers 4a and 4b are of the cold adhesive type, a protective film is bonded releasably to the outer surface of each of these upper adhesive layers. In this case, also, the other side of the support sheet 1 may be arranged to have a low adhesive-bonding ability so that during storage, a plurality of the spacer holder arrangements can be stacked one upon another, with the other side of each support sheet 1 releasably bonded to the upper adhesive layers 4a and 4b of the spacer holder arrangement disposed immediately therebelow.

Each of the upper and lower adhesive layers 4a, 4b, 4'a and 4'b can be made entirely of an adhesive which is composed predominantly of a synthetic resin and/or rubber and is pressure sensitive at room temperature, or can comprise a thin substrate coated and impregnated at opposite sides thereof with such an adhesive. Also, each adhesive layer can be made entirely of an adhesive which is composed predominantly of a synthetic resin and/or rubber and is pressure sensitive upon heating, or can comprise a thin substrate coated and impregnated at opposite sides thereof with such a hot-type adhesive.

The support sheet 1 has an aperture 5 of a circular cross-section formed therethrough, the aperture 5 having a diameter equal to the inner diameter of the inner annular spacer element 2 and being disposed coaxially therewith.

For example, the spacer holder arrangement is produced by preparing a spacer structure composed of inner and outer spacer elements 2 and 3 and starting adhesive layers formed on the opposite sides of the inner and outer spacer elements, attaching this spacer structure to the support sheet 1, sealing the starting adhesive layers at those regions corresponding to the adhesive layers 4a, 4b, 4'a, and 4'b to be formed, and removing unnecessary portions of the starting adhesive layers. At this time, the aperture 5 is formed through the support sheet 1. With this method, the inner and outer spacer elements 2 and 3 can be positioned accurately in concentric relation to each other on the support sheet 1.

For assembling an optical disc using the spacer holder arrangement (FIG. 3), a guide rod 7 is passed through the aperture 5 in the support sheet 1 and the center hole of the inner spacer element 2. Then, one disc-shaped base 6 of the optical disc is brought into contact with the upper adhesive layers 4a and 4b, with the guide rod 7 inserted in the center hole of the base 6, and then is bonded to these adhesive layers by application of either pressure or pressure and heat. Then, the support sheet 1 is removed from the lower adhesive layers 4'a and 4'b, and the other disc-shaped disc of the optical disc is bonded to these adhesive layers 4'a and 4'b in a similar manner.

Figure 4:
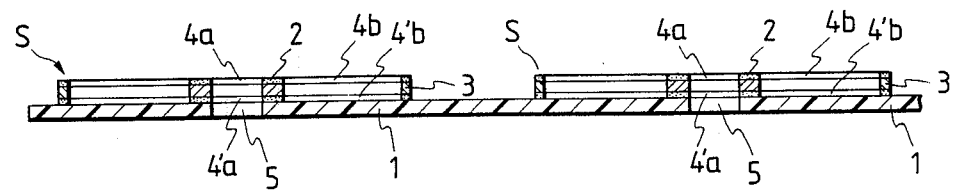
FIG. 4 is a view similar to FIG. 2, but showing a modified spacer holder arrangement.

As shown in FIG. 4, the support sheet 1 can be elongated so that a plurality of preformed spacers S can be carried by the support sheet 1 and spaced from one another along the length thereof. In this case, the elongated support sheet 1 can be formed into a roll or be folded in a zigzag or corrugated manner when the spacer holder arrangement is stored. In this case, a protective film may be wound or folded together with the elongated sheet 1.

As described above, the inner and outer ring-shaped spacer elements 2 and 3, each having the upper and lower adhesive layers 4a, 4b, 4'a and 4'b on the opposite sides thereof, are held concentrically in position on the support sheet 1 to provide the preformed spacer S. Further, since the support sheet 1 has the aperture 5 having the diameter equal to the inner diameter of the inner spacer element 2 and disposed coaxially therewith, the spacer can be attached easily in position to each base of the optical disc through the guide rod 7. Thus, the spacer S is supported on the support sheet 1 in a preformed condition, and can be attached to the bases of the optical disc without changing the relative position between the inner and outer spacer elements 2 and 3. Therefore, there is no need to position the inner and outer spacer elements 2 and 3 relative to each other when assembling the optical disc. This greatly facilitates the mass production of the optical discs.

What is claimed is:

1. A spacer holder arrangement comprising:
    (a) a support sheet having at least one aperture formed therethrough, said support sheet being of a self-supporting nature, and at least one side of said support sheet having a low adhesive-bonding ability; and
    (b) a pair of concentric inner and outer spacer elements of an annular shape disposed on the one side of said support sheet to provide a preformed spacer, each of said inner and outer spacer elements having adhesive layers formed respectively on opposite sides thereof, one of said adhesive layers being interposed between each of said inner and outer spacer elements and said support sheet to bond them releasably together, said inner spacer element having a central hole therethrough which is coaxial with said aperture through said support sheet so that a guide rod can be passed through said aperture and said central hole.

2. A spacer holder arrangement according to claim 1, in which said adhesive layers on the opposite sides of each of said inner and outer spacer elements are annular and equal in width to their mating spacer element and are disposed coaxially therewith.

3. A spacer holder arrangement according to claim 1, in which said aperture in said support sheet is of a circular cross-section, the inner diameter of said inner spacer element defined by an edge of said central hole being equal to a diameter of said aperture.

4. A spacer holder arrangement according to claim 1, in which said adhesive layers are pressure sensitive at room temperature.

5. A spacer holder arrangement according to claim 1, in which said adhesive layers are pressure sensitive upon heating.

6. A spacer holder arrangement according to claim 1, in which said one adhesive layer interposed between each of said inner and outer spacer elements and said support sheet is pressure sensitive at room temperature while the other adhesive on the side of each of said inner and outer spacer elements facing away from said support sheet is pressure sensitive upon heating.

7. A spacer holder arrangement according to claim 1, in which said support sheet is elongated and has a plurality of said apertures spaced from one another along the length of said support sheet, there being provided a plurality of said preformed spacers spaced from one another along the length of said support sheet.

8. A spacer holder arrangement for use in assembling an optical disc having a central hole, comprising:
a support sheet having at least one aperture formed therethrough coaxial with said central hole of said optical disc, said support sheet being of a self-supporting nature, and at least one side of said support sheet having a low adhesive-bonding ability; and
a pair of concentric inner and outer spacer elements of an annular shape disposed on he one side of said support sheet to provide a preformed spacer, each of said inner and outer spacer elements having adhesive layers formed respectively on opposite sides thereof, one of said adhesive layers being interposed between each of said inner and outer spacer elements and said support sheet to bond them releasably together, said inner spacer element also having a central hole therethrough which is coaxial with said aperture through said support sheet so that the guide rod can be passed through said aperture and the central hole of said inner spacer element so as to facilitate assembly of said optical disc without having to position said spacer elements.

* * * * *